US008251312B1

(12) United States Patent
Daso et al.

(10) Patent No.: US 8,251,312 B1
(45) Date of Patent: Aug. 28, 2012

(54) METHOD AND SYSTEM FOR CONTROL OF UPSTREAM FLOWFIELDS OF VEHICLE IN SUPERSONIC OR HYPERSONIC ATMOSPHERIC FLIGHT

(75) Inventors: Endwell O. Daso, Madison, AL (US); Victor E. Pritchett, II, Harvest, AL (US); Ten-See Wang, Huntsville, AL (US); Rebecca Ann Farr, Gurley, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 429 days.

(21) Appl. No.: 12/555,988

(22) Filed: Sep. 9, 2009

(51) Int. Cl.
*B64C 1/38* (2006.01)
(52) U.S. Cl. ......................... 244/130; 244/204
(58) Field of Classification Search .................. 244/130, 244/204, 205, 1 N
See application file for complete search history.

(56) References Cited

U.S. PATENT DOCUMENTS

| | | | | |
|---|---|---|---|---|
| 3,785,591 A * | 1/1974 | Stalmach, Jr. | ............ | 244/171.8 |
| 5,299,762 A * | 4/1994 | Kosson et al. | ............ | 244/117 A |
| 5,452,866 A | 9/1995 | Bulman | | |
| 5,505,409 A | 4/1996 | Wells et al. | | |
| 5,957,413 A | 9/1999 | Glezer et al. | | |
| 6,247,671 B1 * | 6/2001 | Saeks et al. | .................. | 244/205 |
| 6,367,740 B1 * | 4/2002 | Johnson et al. | ............ | 244/45 R |
| 6,405,653 B1 | 6/2002 | Miskelly | | |
| 6,527,221 B1 | 3/2003 | Kremeyer | | |
| 6,739,266 B1 | 5/2004 | Castano et al. | | |
| 6,793,177 B2 | 9/2004 | Bonutti | | |
| 6,849,247 B1 | 2/2005 | Wagaman et al. | | |
| 7,063,288 B1 | 6/2006 | Kremeyer | | |
| 7,121,511 B2 * | 10/2006 | Kremeyer | ............ | 244/130 |
| 7,123,544 B1 | 10/2006 | Kuklinski | | |
| 7,226,325 B1 | 6/2007 | Kirschner et al. | | |
| 7,599,805 B2 * | 10/2009 | Pilon | .................. | 702/39 |
| 2007/0095987 A1 | 5/2007 | Glezer et al. | | |
| 2007/0176046 A1 | 8/2007 | Kremeyer | | |
| 2008/0128561 A1 | 6/2008 | Hyde et al. | | |
| 2008/0290218 A1 * | 11/2008 | Schwimley et al. | ............ | 244/130 |

OTHER PUBLICATIONS

Daso, Endwell O. et al., Dynamics of Shock Dispersion and Interactions in Supersonic Freestreams with Counterflowing Jets, American Institute of Aeronautics and Astronautics AIAA Journal, Jun. 2009, pp. 1313-1326, vol. 47 No. 6.

* cited by examiner

*Primary Examiner* — Christopher P Ellis
(74) *Attorney, Agent, or Firm* — Peter J. Van Bergen; James J. McGroary

(57) ABSTRACT

The upstream flowfield of a vehicle traveling in supersonic or hypersonic atmospheric flight is actively controlled using attribute(s) experienced by the vehicle. Sensed attribute(s) include pressure along the vehicle's outer mold line, temperature along the vehicle's outer mold line, heat flux along the vehicle's outer mold line, and/or local acceleration response of the vehicle. A non-heated, non-plasma-producing gas is injected into an upstream flowfield of the vehicle from at least one surface location along the vehicle's outer mold line. The pressure of the gas so-injected is adjusted based on the attribute(s) so-sensed.

27 Claims, 3 Drawing Sheets

METHOD AND SYSTEM FOR CONTROL OF UPSTREAM FLOWFIELDS OF VEHICLE IN SUPERSONIC OR HYPERSONIC ATMOSPHERIC FLIGHT

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to aerodynamic reshaping of the external flow environment around a vehicle in supersonic or hypersonic atmospheric flight. More specifically, the invention is a method and system for control of the flowfields upstream of a vehicle in supersonic or hypersonic atmospheric flight.

2. Description of the Related Art

Various high speed vehicles such as aircraft and spacecraft flying through the atmosphere in the supersonic or hypersonic flight regime are subjected to flowfields that have enormous effects on aerodynamic efficiency, the acoustic environment experienced by the vehicle, the aerothermal environment experienced by the vehicle, the complex shock system encountered by the vehicle, and the sonic boom created by the vehicle. The relevance and/or severity of these effects impact vehicle design, the particular flight regime and trajectory being experienced, the payload, etc. Currently, a variety of specialized flow control systems and methods are employed/proposed to individually address the various effects. An example is a mechanical spike for sonic boom mitigation of supersonic aircraft and vehicle design optimization for drag reduction. Accordingly, vehicles that must operate in the supersonic or hypersonic flight regimes are sometimes equipped with systems that are effective for only part of a vehicle's flight, yet must be carried the entire flight. These systems increase the cost, complexity, weight and operational requirements of a vehicle while only providing a limited benefit.

More recently, laboratory studies have investigated the use of cold gas injection into a vehicle's free stream in order to weaken or disperse the shock waves experienced by supersonic or hypersonic vehicles. See "The Dynamics of Shock Dispersion and Interactions in Supersonic Free Streams with Counterflowing Jets," Endwell O. Daso et al., American Institute of Aeronautics and Astronautics, AIAA-2007-1423, January 2007. Although promising in concept, these laboratory studies do not translate into real-world solutions to improving vehicle performance in supersonic or hypersonic atmospheric flight.

SUMMARY OF THE INVENTION

Accordingly, it is an object of the present invention to provide a comprehensive method and system for controlling the various flowfield phenomena experienced by a vehicle in supersonic or hypersonic flight.

Another object of the present invention is to provide a method and system that adapts to changing flowfield conditions experienced by a vehicle in supersonic or hypersonic flight.

Other objects and advantages of the present invention will become more obvious hereinafter in the specification and drawings.

In accordance with the present invention, a method is provided for actively controlling the upstream flowfield of a vehicle traveling in supersonic or hypersonic atmospheric flight. At least one attribute being experienced by a vehicle in one of supersonic and hypersonic atmospheric flight is sensed. The attribute(s) is selected from the group consisting of pressure along the vehicle's outer mold line, temperature along the vehicle's outer mold line, heat flux along the vehicle's outer mold line, and local acceleration response of the vehicle. A non-heated, non-plasma-producing gas is injected into an upstream flowfield of the vehicle from at least one surface location along the vehicle's outer mold line. The pressure of the gas so-injected is adjusted based on the attribute(s) so-sensed.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
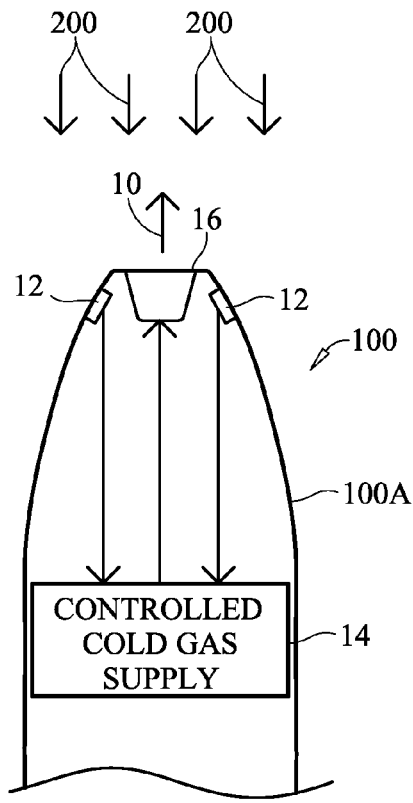
FIG. 1 is a schematic view of a portion of a vehicle equipped with a system for active control of the vehicle's upstream flowfield in accordance with an embodiment of the present invention.

Referring now to the drawings and more particularly to FIG. 1, a schematic view of a portion of a supersonic or hypersonic transatmospheric vehicle 100 is illustrated along with the upstream flowfield 200 that it is about to encounter. For purpose of the present invention, it will be assumed that vehicle 100 is traveling in a supersonic or hypersonic flight regime. As will be explained below, an advantage of the present invention is the ability to adapt its operation to the particular flight regime of vehicle 100 and effects being experienced thereby. It is to be understood that the present invention can be extended to any vehicle (e.g., aircraft, spacecraft, etc.) capable of supersonic or hypersonic atmospheric flight to include a launch vehicle, a vehicle experiencing extended atmospheric flight, and a vehicle experiencing such flight upon entry or re-entry into planetary atmospheres.

In general, vehicle 100 is equipped to inject a controlled flow (indicated by arrow 10) of a non-heated, non-plasma-producing gas also known as a "cold" gas into upstream flowfield 200. By actively controlling the mass flow rate, velocity and/or pressure of flow 10, performance penalties due to wave drag, acoustic loads, aerothermal loads/heat flux, sonic boom, and local acceleration can be reduced or mitigated on vehicles in supersonic or hypersonic flight. To achieve such active and adaptive control, the present invention employs a closed-loop control system defined generally by one or more sensors 12, a controlled cold gas supply 14, and one or more nozzles 16 for injecting controlled flow 10 into upstream flowfield 200.

As will be explained further below, sensors 12 are selected and positioned to sense attributes being experienced by vehicle 100 at one or more locations along the vehicle's outer mold line 100A and/or one or more locations within vehicle 100. The attributes of interest include pressure and temperature and/or heat flux at certain locations along outer mold line 100A and acceleration responses (e.g., propulsion system induced) experienced at certain locations within vehicle 100 (e.g., regions or systems of interest within vehicle 100 that can be subjected to local dynamic acceleration (due to local vehicle design) that are different than the uniform vehicle acceleration acting on vehicle 100 which are due to changes in vehicle velocity. Sensors 12 can detect point or field measurements without departing from the scope of the present invention.

Controlled cold gas supply 14 provides a controlled flow of a cold gas to nozzle(s) 16 based on the attributes sensed by sensors 12 at any given time during the flight of vehicle 100. The controlled flow of cold gas is, in turn, injected as controlled flow 10 into upstream flowfield 200. The particular mass flow rate and pressure of the cold gas supplied by gas supply 14 is regulated based on the outputs of sensors 12 and the type of flight regime (e.g., supersonic or hypersonic) being experienced by vehicle 100. The cold gas delivered to nozzle(s) 16 can originate from an onboard storage supply thereof or from ambient air without departing from the scope of the present invention.

Nozzle(s) 16 can be any of a variety of nozzle designs capable of injecting controlled flow 10 at a velocity that is typically sonic or supersonic. The particular nozzle design is not a limitation of the present invention. However, in an effort to make the present invention applicable to a wide variety of vehicle types, a nozzle of the present invention could be formed in a uniform or standardized blank that has the same external size/configuration regardless of the particular nozzle design.

In operation, as vehicle 100 travels at supersonic or hypersonic speeds, sensors 12 continually provide attribute information to cold gas supply 14. The attribute information and velocity of vehicle 100 are used by cold gas supply 14 to adjust controlled flow 10 in terms of its static or dynamic pressure and flow rate. By doing this, the present invention alters or reshapes upstream flowfield 200 to reduce vehicle drag, sonic boom, the acoustic environment acting on vehicle 100, the aerothermal environment acting on vehicle 100, and/or mitigate acceleration effects experienced by specified locales within vehicle 100. Thus, the present invention is a single comprehensive system approach that adapts to a variety of vehicle speeds to impact a variety of atmospheric flight effects.

Figure 2:
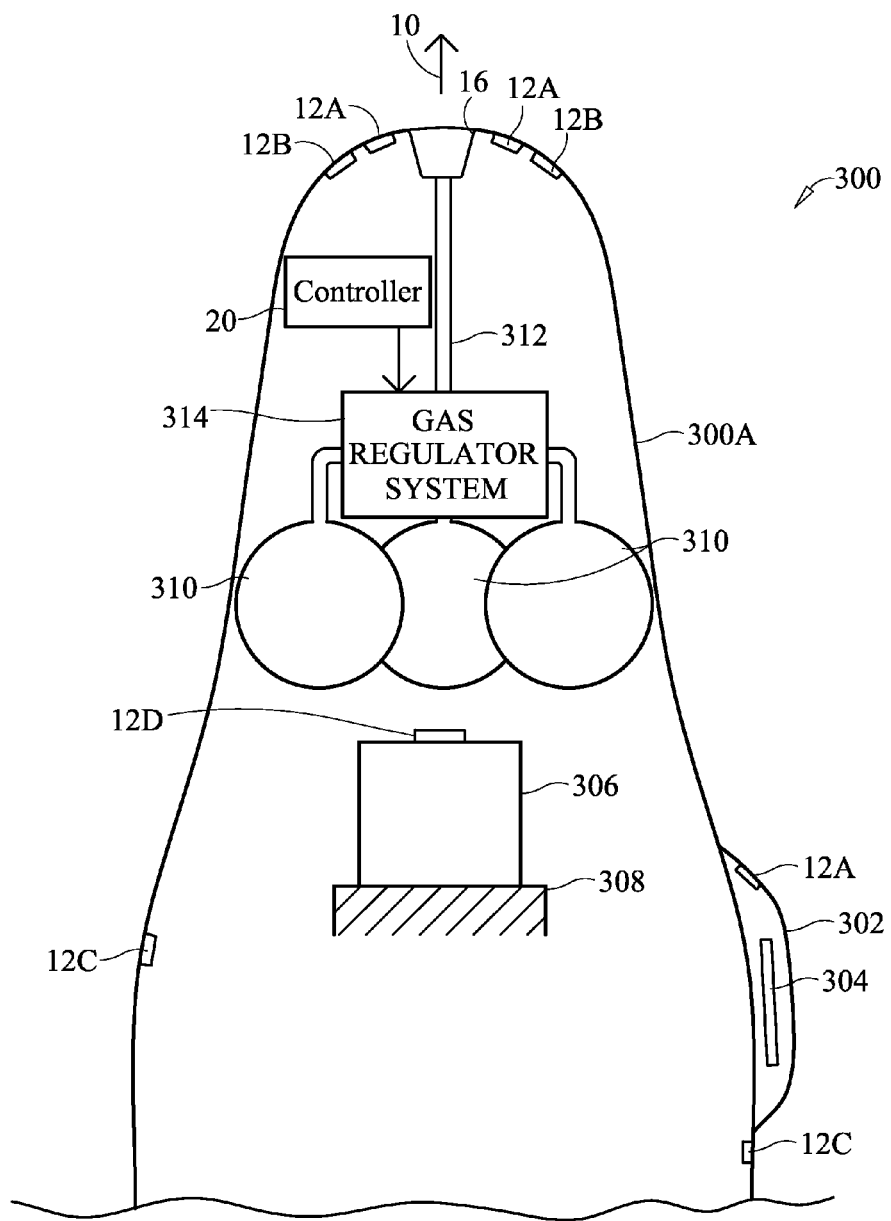
FIG. 2 is a more detailed schematic view of the forward portion of a vehicle equipped with an onboard cold gas supply and delivery system.

A more detailed embodiment of the present invention is illustrated in FIG. 2 where the upper portion of a launch vehicle 300 is equipped with an onboard cold gas supply and delivery system. A variety of sensors 12A-12D are positioned on and in vehicle 300. In the illustrated embodiment, sensors 12A represent temperature and/or heat flux sensors, sensors 12B represent total pressure sensors, sensors 12C represent fluctuating pressure sensors, and sensor 12D represents an acceleration sensor (e.g., triaxial accelerometer). Temperature and/or heat flux sensors 12A are placed at various places on the exterior of vehicle 300 such as the outer mold line 300A thereof. Typically, one or more of temperature sensors 12A are positioned near the exit of nozzle 16 (or near each such nozzle exit) in order to sense the aerothermal environment thereat. Such data is used to adjust controlled flow 10 in order to mitigate the aerothermal environment.

If vehicle 300 includes structures that protrude from the outer mold line thereof, it may be necessary to also sense temperature at such structures. For example, vehicle 300 could include a protruding structure 302 housing a radio frequency (RF) transceiver 304. At hypersonic vehicle speeds of Mach 10 and greater, an ionized hypersonic boundary or plasma sheet (not shown) forms over structure 302. This plasma sheet creates an electrically conducting field that prevents penetration by RF transmissions to thereby place vehicle 300 in the well-known communications blackout. Accordingly, by monitoring temperature along structure 302, the present invention can control flow 10 to produce a cooling effect along outer mold line 300A and structure 302 to thereby prevent formation of the plasma sheet over structure 302. In this way, RF transceiver 304 will be able to maintain two-way RF communication even at hypersonic speeds.

Total pressure sensors 12B are also positioned along outer mold line 300A in proximity to the exit of nozzle 16 (or near each such nozzle exit). In certain modes of operation, shock experienced by the vehicle is significantly diffused when the static pressure at each nozzle's exit is approximately equal to the pressure of the ambient atmosphere.

Fluctuating pressure sensors 12C are designed to detect pressure fluctuations at one or more locations along outer mold line 300A. Such pressure fluctuations can induce undesirable acoustic environment. To reduce or mitigate such pressure fluctuations, controlled flow 10 is adjusted to reduce fluctuating boundary layer interaction with the outer mold line's structure 302 of the vehicle.

Acceleration sensor(s) 12D is typically coupled to an onboard structure 306 in order to sense local acceleration responses thereof. For example, structure 306 could be a payload on vehicle 300 where structure 306 is supported on mounting hardware 308 that imparts a local forcing function to structure 306. To counteract this forcing function, controlled flow 10 can be adjusted (based on the output of acceleration sensor 12D) to adjust the frequency of the controlled flow 10 in a dynamic fashion to produce a counter-acting forcing function which is 180 degrees out of phase with the original forcing function, thereby mitigating the forces experienced by structure 306.

The outputs of the above-described sensors 12A-12D are input to a controller 20 provided in vehicle 300. For clarity of illustration, signal lines coupling each sensor to controller 20 have been omitted. Controller 20 uses the sensor outputs along with current vehicle speed information (e.g, provided by other well know systems) to develop control signals that regulate the flow rate and pressure of a cold gas supplied to nozzle 16. In the illustrated embodiment, the cold gas is stored in one or more pressurized tanks 310 onboard vehicle 300. When needed, the pressurized cold gas is delivered to nozzle 16 via a feed line 312 in a controlled fashion by means of a gas regulator system 314 (e.g., manifold, regulator, control valves, pressure sensors, flow rate sensors, etc.). Controller 20 regulates the operation of gas regulator system 314.

Figure 3A:
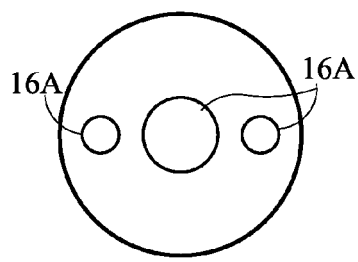
FIG. 3A is a plan view of a vehicle nose having an arrangement of three nozzle exits formed therein.
Figure 3C:
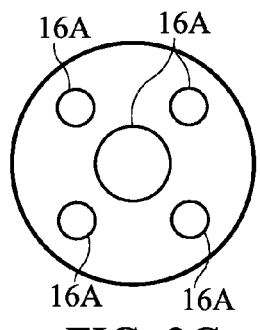
FIG. 3C is a plan view of a vehicle nose having an arrangement of five nozzle exits formed therein.
Figure 3B:
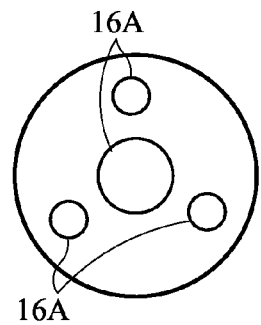
FIG. 3B is a plan view of vehicle nose having an arrangement of four nozzle exits formed therein.
Figure 4:
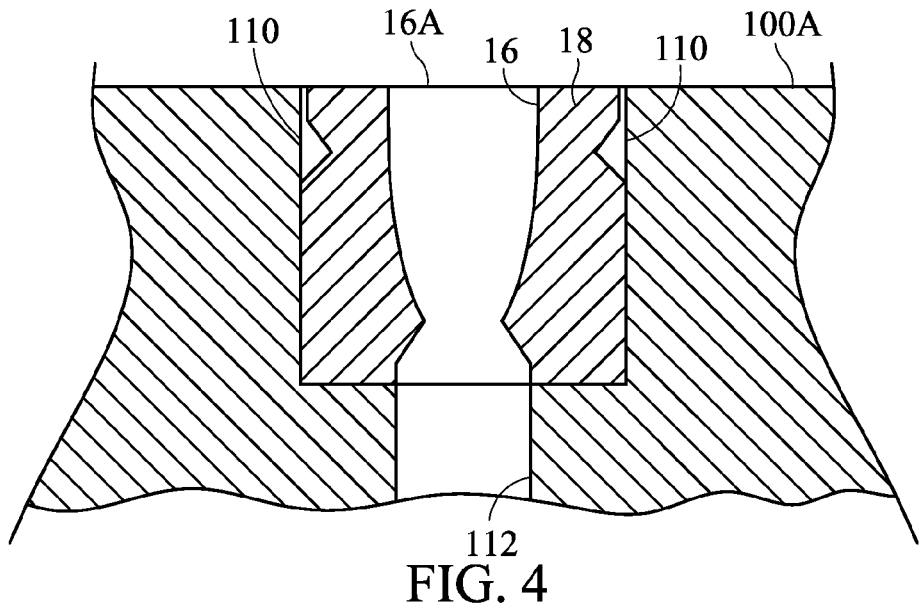
FIG. 4 is a cross sectional view of the outer mold line at a vehicle's nose illustrating the use of an interchangeable nozzle body.

Although the previous embodiments of the present invention have been described using a single nozzle with its exit facing the vehicle's upstream flowfield, the present invention is not so limited. For example, a plurality of nozzles could be provided in a vehicle's nose region as shown in the plan views of FIGS. 3A-3C where three nozzle exits 16A are shown in FIG. 3A, four are shown in FIG. 3B, and five are shown in FIG. 3C. Further, each nozzle in the present invention could be integrated into a vehicle, or could be interchangeably integrated into a vehicle. For example, FIG. 4 illustrates a nozzle body 18 with nozzle 16 formed therein. Nozzle body 18 is fitted into a vehicle bore 110 such that the exit 16A of nozzle 16 is aligned with the vehicle's outer mold line 100A. A feed line 112 is coupled to nozzle 16 to supply cold gas thereto. The exterior of nozzle body 18 is a representation of a standardized size/configuration that can support a variety of nozzle geometries without requiring any changes to the exterior size of nozzle body 18 or bore 110. The exterior of nozzle body 18 can be configured in a standard or uniform way to support mounting thereof in a vehicle.

Although the present invention has described the use of one or more nozzles located in the nose region of a vehicle, it is not so limited. That is, a controlled flow of non-heated, non-plasma-producing gas can be injected into a vehicle's flowfield from any surface location on a vehicle that faces an upstream flowfield. For example, the present invention could be used on supersonic jet aircraft where surface locations facing the upstream flowfield could include the nose of the aircraft, leading edge regions of the aircraft's wings, etc. Still further, the present invention can be employed for use in the atmospheric re-entry regime of flight. In this case, the upstream flowfield is a re-entry flowfield that envelopes the vehicle as it re-enters a planetary atmosphere. The non-heated, non-plasma-producing gas is injected from the location(s) on the vehicle facing the re-entry flowfield to mitigate the harsh effects of the re-entry flowfield such as those generated by the aerothermal environment.

Figure 5:
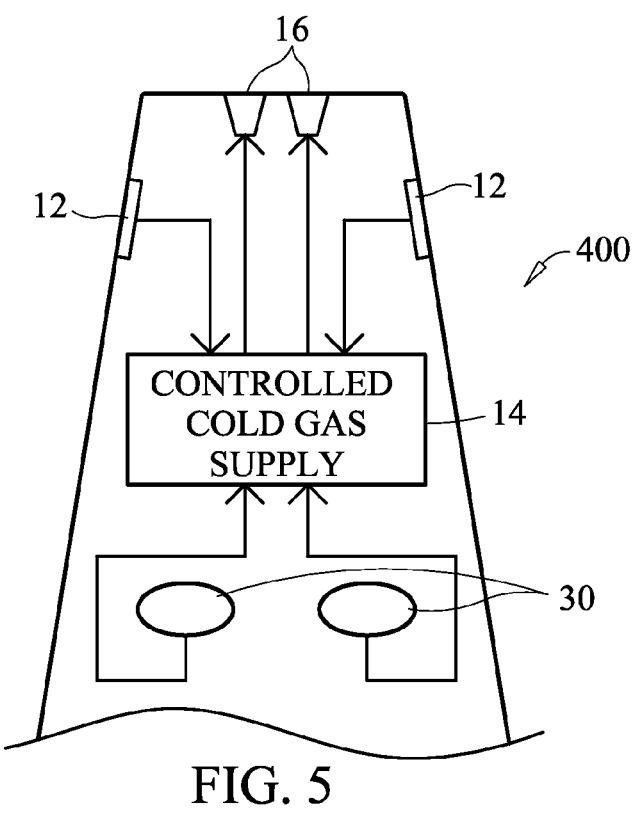
FIG. 5 is a schematic view of a portion of a vehicle equipped with an ambient-air cold gas supply and delivery system.

Depending on the type of vehicle, the present invention could utilize ambient air as the cold gas thereby minimizing or eliminating the need to store an onboard supply of cold gas so that the present invention's operation can be sustained during sustained flight or cruise. Accordingly, FIG. 5 illustrates a system for collecting, pressurizing and delivering ambient air to one or more nozzles 16 provided in a vehicle 400. Ambient atmospheric gases can be collected via existing engine inlets 30 and then directed by cold gas supply 14 in order to continuously supply nozzles 16.

The advantages of the present invention are numerous. Vehicles traveling in supersonic or hypersonic atmospheric flight are provided with a single comprehensive method and system for reducing or mitigating the effects of drag, aerodynamic heating, acoustic loads, and vibrations. A single system makes adjustments to handle a variety of phenomena experienced over a range of supersonic or hypersonic Mach numbers. The cold gas can be stored onboard and/or utilize ambient air thereby making the approach a viable alternative for a variety of vehicle types.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of actively controlling the upstream flowfield of a vehicle traveling in supersonic or hypersonic atmospheric flight, comprising the steps of:

sensing at least one attribute being experienced by a vehicle in one of supersonic and hypersonic atmospheric flight, said at least one attribute selected from the group consisting of pressure along the vehicle's outer mold line, temperature along the vehicle's outer mold line, heat flux along the vehicle's outer mold line, and local acceleration response of the vehicle;

injecting a non-heated, non-plasma-producing gas into an upstream flowfield of the vehicle from at least one surface location along the vehicle's outer mold line; and adjusting pressure of said gas so-injected based on said at least one attribute so-sensed.

2. A method according to claim 1, wherein each said surface location faces said upstream flowfield.

3. A method according to claim 2, wherein said step of sensing pressure includes the step of sensing total pressure in proximity to each said surface location.

4. A method according to claim 2, wherein said step of sensing pressure includes the step of sensing fluctuating pressure at a plurality of locations along the vehicle's outer mold line.

5. A method according to claim 2, wherein said step of sensing temperature includes the step of sensing at least one of temperature and heat flux in proximity to each said surface location.

6. A method according to claim 1, wherein the vehicle includes at least one protuberance extending from the vehicle's outer mold line, and wherein said step of sensing further includes the step of sensing at least one of temperature and heat flux on each said protuberance.

7. A method according to claim 1, wherein said step of injecting includes the step of employing ambient air as said gas.

8. A method according to claim 1, wherein said step of injecting includes the step of storing a supply of said gas onboard the vehicle.

9. A method according to claim 1, wherein said gas so-injected has a Mach number selected from the group consisting of a sonic Mach number and a supersonic Mach number.

10. A method according to claim 1, wherein said step of adjusting controls said pressure of said gas so-injected at each said surface location to be approximately equal to ambient static pressure.

11. A method according to claim 1, wherein said step of adjusting controls said pressure of said gas so-injected dynamically.

12. A system for actively controlling the upstream flowfield of a vehicle traveling in supersonic or hypersonic atmospheric flight, comprising:

a plurality of sensors adapted to be coupled to a vehicle capable of at least one of supersonic and hypersonic atmospheric flight, each of said sensors capable of sensing at least one attribute selected from the group consisting of pressure along the vehicle's outer mold line, temperature along the vehicle's outer mold line, heat flux along the vehicle's outer mold line, and local acceleration response of the vehicle;

at least one nozzle adapted to have its exit located at a location on the vehicle's surface facing an upstream flowfield;

a cold gas supply system adapted to be mounted in the vehicle and coupled to each said nozzle for delivering a cold gas thereto, wherein a non-heated, non-plasma-producing gas is injected by each said nozzle into the upstream flowfield; and a controller coupled to said sensors and said cold gas supply system for controlling pressure of said gas so-injected by each said nozzle based on each said attribute so-sensed.

13. A system as in claim 12, wherein said sensors are selected from the group consisting of total pressure sensors, fluctuating pressure sensors, temperature sensors, heat flux sensors, and accelerometers.

14. A system as in claim 12, wherein each said nozzle includes a nozzle body defined by a standardized external configuration.

15. A system as in claim 12, wherein said cold gas supply system includes means for storing a supply of said cold gas onboard the vehicle.

16. A system as in claim 12, wherein said cold gas comprises ambient air and wherein said cold gas supply system includes means for delivering the ambient air to each said nozzle.

17. A system as in claim 12, wherein each said nozzle is selected from the group consisting of sonic and supersonic nozzles.

18. A system for actively controlling the upstream flowfield of a vehicle, comprising:
- a vehicle capable of at least one of supersonic and hypersonic atmospheric flight, said vehicle defined by an outer mold line;
- a plurality of sensors adapted to be coupled to said vehicle along an outer mold line thereof, each of said sensors capable of sensing at least one attribute selected from the group consisting of pressure along said outer mold line, temperature along said outer mold line, heat flux along said outer mold line, and local acceleration response of said vehicle;
- at least one nozzle mounted in said vehicle, each said nozzle having an exit located at a surface of said vehicle that faces upstream thereof;
- a cold gas supply system mounted in said vehicle and coupled to each said nozzle for delivering a cold gas thereto, wherein a non-heated, non-plasma-producing gas is injected by each said nozzle upstream of said vehicle; and
- a controller coupled to said sensors and said cold gas supply system for controlling pressure of said gas so-injected by each said nozzle based on each said attribute so-sensed.

19. A system as in claim 18, wherein said sensors for sensing pressure include at least one total pressure sensor in proximity to each said surface location.

20. A system as in claim 18, wherein said sensors for sensing pressure include at least one fluctuating pressure sensor at a location along said outer mold line aft of each said surface location.

21. A system as in claim 18, wherein said sensors for sensing temperature include at least one temperature sensor in proximity to each said surface location.

22. A system as in claim 18, wherein said vehicle includes at least one protuberance extending from said outer mold line thereof, and wherein said sensors further comprise at least one temperature sensor on each said protuberance.

23. A system as in claim 22, wherein said at least one protuberance houses a radio frequency transceiver.

24. A system as in claim 18, wherein said cold gas supply system includes means for storing a supply of said gas onboard said vehicle.

25. A system as in claim 18, wherein said cold gas comprises ambient air and wherein said cold gas supply system includes means for delivering the ambient air to each said nozzle.

26. A system as in claim 18, wherein each said nozzle is selected from the group consisting of sonic and supersonic nozzles.

27. A system as in claim 18, wherein each said nozzle includes a nozzle body defined by a standardized external configuration.

* * * * *